(12) United States Patent
Bono et al.

(10) Patent No.: US 10,048,885 B1
(45) Date of Patent: Aug. 14, 2018

(54) MANAGING RECLAIMING STORAGE SPACE IN FILE SYSTEMS

(71) Applicant: EMC IP Holding Company LLC, Hopkinton, MA (US)

(72) Inventors: Jean-Pierre Bono, Westborough, MA (US); William C. Davenport, Burlington, MA (US); Philippe Armangau, Acton, MA (US); Dennis T. Duprey, Raleigh, NC (US); Yingchao Zhou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/502,036

(22) Filed: Sep. 30, 2014

(51) Int. Cl.
*G06F 3/06* (2006.01)

(52) U.S. Cl.
CPC ............ *G06F 3/0643* (2013.01); *G06F 3/065* (2013.01); *G06F 3/067* (2013.01); *G06F 3/0619* (2013.01); *G06F 3/0689* (2013.01); *G06F 2003/0692* (2013.01); *G06F 2201/84* (2013.01); *G06F 2212/1032* (2013.01); *G06F 2212/262* (2013.01)

(58) Field of Classification Search
CPC ...... G06F 3/0643; G06F 3/0619; G06F 3/065; G06F 3/067; G06F 3/0689; G06F 2003/0692; G06F 2201/84; G06F 2212/1032; G06F 2212/262; G06F 12/0253
See application file for complete search history.

(56) References Cited

U.S. PATENT DOCUMENTS

| | | | | |
|---|---|---|---|---|
| 6,065,020 | A | * | 5/2000 | Dussud ............... G06F 12/0253 |
| 8,285,758 | B1 | * | 10/2012 | Bono ................. G06F 17/30079 707/822 |
| 2007/0033240 | A1 | * | 2/2007 | Barsness ............ G06F 12/0253 |
| 2012/0331242 | A1 | * | 12/2012 | Shaikh ............... G06F 12/0261 711/154 |

* cited by examiner

*Primary Examiner* — Ramon A. Mercado
(74) *Attorney, Agent, or Firm* — Krishnendu Gupta; Jason Reyes; Deepika Bhayana

(57) ABSTRACT

A method is used in managing reclaiming storage space in file systems. Characteristics of a file system and a data service executing upon the file system are evaluated. Based on the evaluation, reclamation of storage space from the file system is affected based on a set of policies.

16 Claims, 6 Drawing Sheets

MANAGING RECLAIMING STORAGE SPACE IN FILE SYSTEMS

BACKGROUND

Technical Field

This application relates to managing reclaiming storage space in file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like. However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a mapped LUN (e.g., thin logical unit (TLU), direct logical unit (DLU)), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

Generally, data storage systems typically arrange the data and metadata of file systems in blocks of storage. For example, the file data constituting files in a file system are stored in blocks of storage, as are inodes, indirect blocks, and other metadata. Data storage systems may provision storage to file systems in units of fixed size, here called "slices." Data storage systems may generate slices, for example, from one or more physical storage devices, such as RAID groups of physical storage devices.

Some data storage systems provide thinly provisioned file systems that are organized based on sparsely populated logical unit such as mapped LUNs. Thinly provisioned file systems typically have very large address spaces but allocate specific storage slices to populate file systems only as storage is needed to satisfy write requests. A thinly provisioned file system may thus have an address space that is measured in petabytes but may allocate slices to occupy only a small fraction of the address space.

Data storage systems that provide thinly provisioned file systems may deallocate blocks of storage from the file systems when the blocks are no longer used, as part of file system shrink operations. In one kind of shrink operation, a data storage system identifies free blocks of storage in the slices supporting the file system. Any completely freed slices may be returned to a storage pool for later reuse.

Accordingly, there exists a need for systems, methods, and computer readable media for efficiently managing reclaiming storage in file systems.

SUMMARY OF THE INVENTION

A method is used in managing reclaiming storage space in file systems. Characteristics of a file system and a data service executing upon the file system are evaluated. Based on the evaluation, reclamation of storage space from the file system is affected based on a set of policies.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
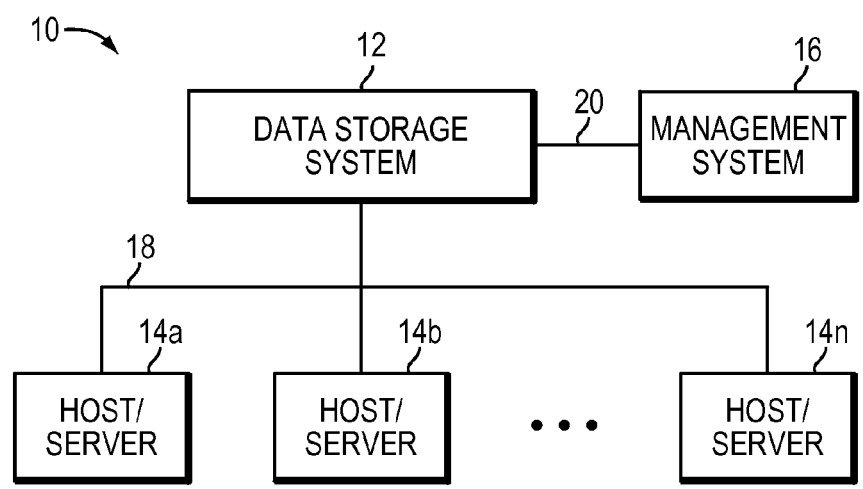
FIGS. 1-2 are examples of an embodiment of a computer system that may utilize the techniques described herein.

Described below is a technique for use in managing reclaiming storage space in file systems, which technique may be used to provide, among other things, evaluating characteristics of a file system and a data service executing upon the file system, and based on the evaluation, affecting reclamation of storage space from the file system based on a set of policies.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A pool may include a set of storage tiers. A storage tier may include storage devices of similar or same performance capabilities and cost. However, a pool may have storage devices of different performance capabilities and costs. Both pool and storage tier contain slices. A slice may be considered the smallest element that can be tracked and moved. A storage tier or a storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to herein as "direct mapped LUN" or "thick LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File system mapping logic in a storage system provides a thin provisioning service by adding fixed sized slices to a file system when the file system needs storage space to write data. In such a case, when a file system requires a slice, the file system sends a request to provision the slice to a slice manager component of a storage system. A slice request framework manages requests to provision slices.

Generally, a slice request framework in a data storage system manages provisioning of slices to a mapped LUN associated with a file system such that the slice request framework adds a slice to the file system or a volume of the file system when the slice request framework receives a request to provision the slice. A file system may need to provision a slice when the file system requires storage space for writing data. Further, a file system may also need to provision a slice when a file system recovery mechanism such as FSCK utility and volume recovery logic requires a slice to recover metadata of the file system. In such a case, a file system may require a slice to perform operations such as duplicate metadata and add metadata.

Further, a host may send file system requests to write data to blocks in slices included in a file system. A slice may be allocated to the file system for writing the data if either no storage space has been allocated to the file system or sufficient storage space for writing the data does not exists in the file system. Further, at some point, a host may send a file system request that may cause a file system to delete data in a set of blocks. For example, a user of the host may delete a file (or a portion thereof) or a directory. Thus, the set of blocks associated with the portion of the file system that is being deleted become free. However, a slice in which the set of blocks reside may not be deallocated as a free slice if a portion of the slice is in use by the file system. Thus, it should be understood that, while the set of blocks is now free, the slice including the set of blocks still maintains its allocated storage space in a slice pool.

Further, in response to a deletion command performed on a file system, or at some other time, a storage system may initiate a scavenge operation. In response to the initiation of the scavenge operation, the storage system may access a set of data structures to locate any free blocks in a file system. Upon locating free blocks, the storage system performs a hole punching operation on the free blocks. As part of a hole punching operation, the storage system locates the corresponding free blocks on slices and frees the blocks by deleting any data in the blocks. Further, at some later time, the storage system may examine slices and if any slice is only partially filled with contents, the slice may be evacuated, such that its content is moved to another slice and it is made free of all content. The evacuated slice may then be returned to a storage pool as a free slice, where it may be repurposed. Further, a slice may also be deallocated from a file system if the slice is no longer required. Thus, as a result of storage reclaim process (also referred to herein as "slice evacuation"), a storage system may return free slices to a storage pool where the free slices do not include any allocated data block containing data and/or metadata. In such a case, free slices returned to a storage pool may then become available to a user to be allocated to another file system.

Thus, reclaiming storage from a file system returns free space that has been allocated to the file system back to a storage pool such that existing objects or new objects may use the free space for allocation. Further, a file system may be organized on a storage system based on any one of different configurations such as the file system may be organized as a thick file system that is mapped to a direct mapped LUN, the file system may be organized as a thin file system that is mapped to a thin mapped LUN, or the file system may be organized as a thin file system with deduplication enabled for data blocks of the thin file system. Moreover, different data services (e.g., such as snap, replication, backup) may be performed on a file system.

Conventionally, storage is reclaimed from a file system without taking into consideration how the file system has been organized on a storage system. Thus, in such a conventional system, storage reclaim process does not take into account a file system layout for a file system. Further, in such a conventional system, storage is reclaimed from a file system without taking into consideration different types of data services executing on the file system at the time storage space is being reclaimed. Further, in such a conventional system, a preference of a user indicating the type of optimization desired by that user is not taken into consideration when reclaiming storage from a file system. For example, in such a conventional system, a user of a storage system may prefer to optimize storage efficiency when reclaiming storage from a file system indicating that the user may prefer to return free space to a storage pool at a fast pace. Further, for example, in such a conventional system, a user of a storage system may prefer to minimize burden on data services executing on a file system indicating that the user may prefer to minimize the amount of time it may take to perform such services on the file system. Further, for example, in such a conventional system, a user of a storage system may prefer to minimize load on a storage processor indicating that the user may prefer to minimize consumption of storage resources (e.g., CPU, memory load) of the storage processor. However, in such a conventional system, none of the user preferences indicated above herein is taken into account when reclaiming storage from a file system. Consequently, in such a conventional system, a storage reclaim process may increase load on a storage processor, may impact data services executing on a file system, and may require a long time to finish reclaiming storage.

By contrast, in at least some implementations in accordance with the technique as described herein, the current technique reclaims storage in a file system organized on a storage system based on a policy which takes into consideration a set of criteria such as how the file system has been organized on a storage device, effect of different data services executing on the file system, and impact of storage reclamation on system resources of the storage system. Thus, in at least one embodiment of the current technique, the current technique is able to adjust the rate at which storage is reclaimed from file systems based on a policy which may be pre-defined. Further, in at least one embodiment of the current technique, feedback from a user may be included in a set of criteria based on which a policy is considered for reclaiming storage such that the user may choose to optimize for storage efficiency, to minimize load on data services executing on file systems, or to minimize load on system resources of a storage system.

In at least some implementations in accordance with the current technique as described herein, the use of the managing reclaiming storage in file systems technique can provide one or more of the following advantages: improving efficiency of a data storage system by efficiently reclaiming storage space from a volume or file system, improving performance of data services executing on file systems of a storage system by efficiently managing reclaiming storage space from the file systems, and improving storage efficiency in a storage system by efficiently reclaiming storage from a file system organized on the storage system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN thru fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
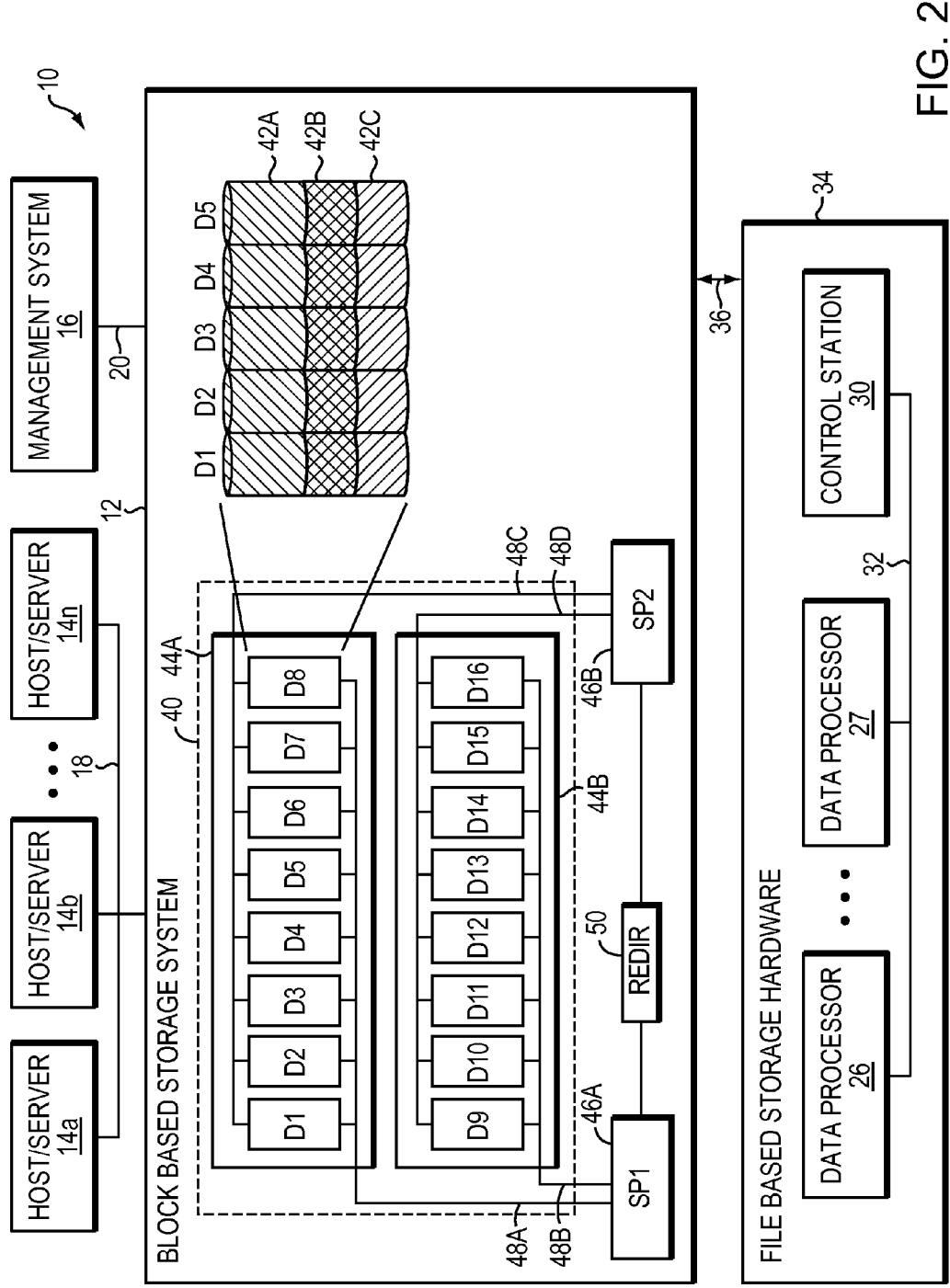

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 3:
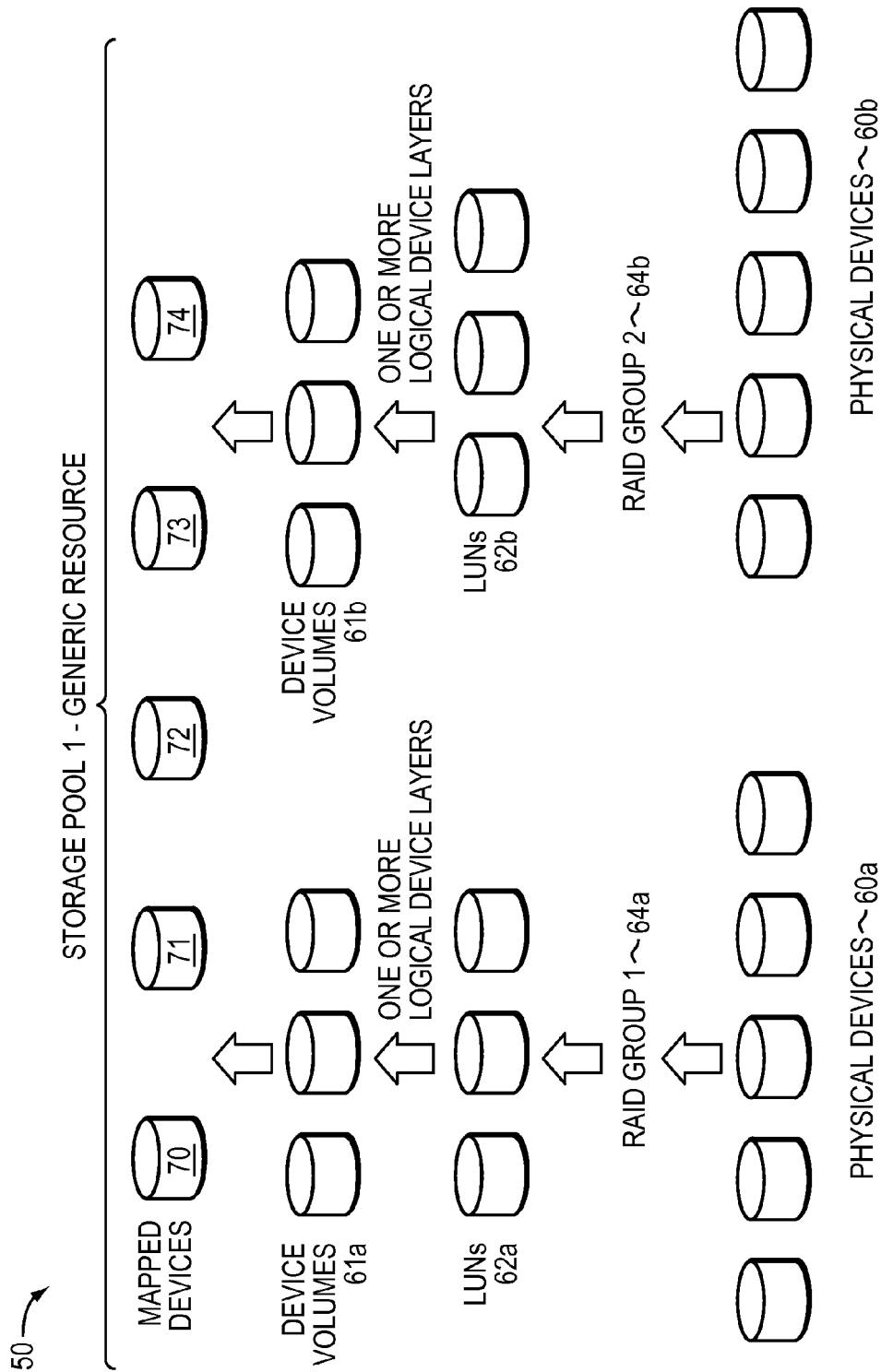
FIG. 3 is an example illustrating a storage device layout.

Referring to FIG. 3, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" mapped device results in either a null pointer (or equivalent) indicating that no corresponding physical storage space has yet been allocated, or results in a reference to a data device which in turn references the underlying physical storage space.

Figure 4:
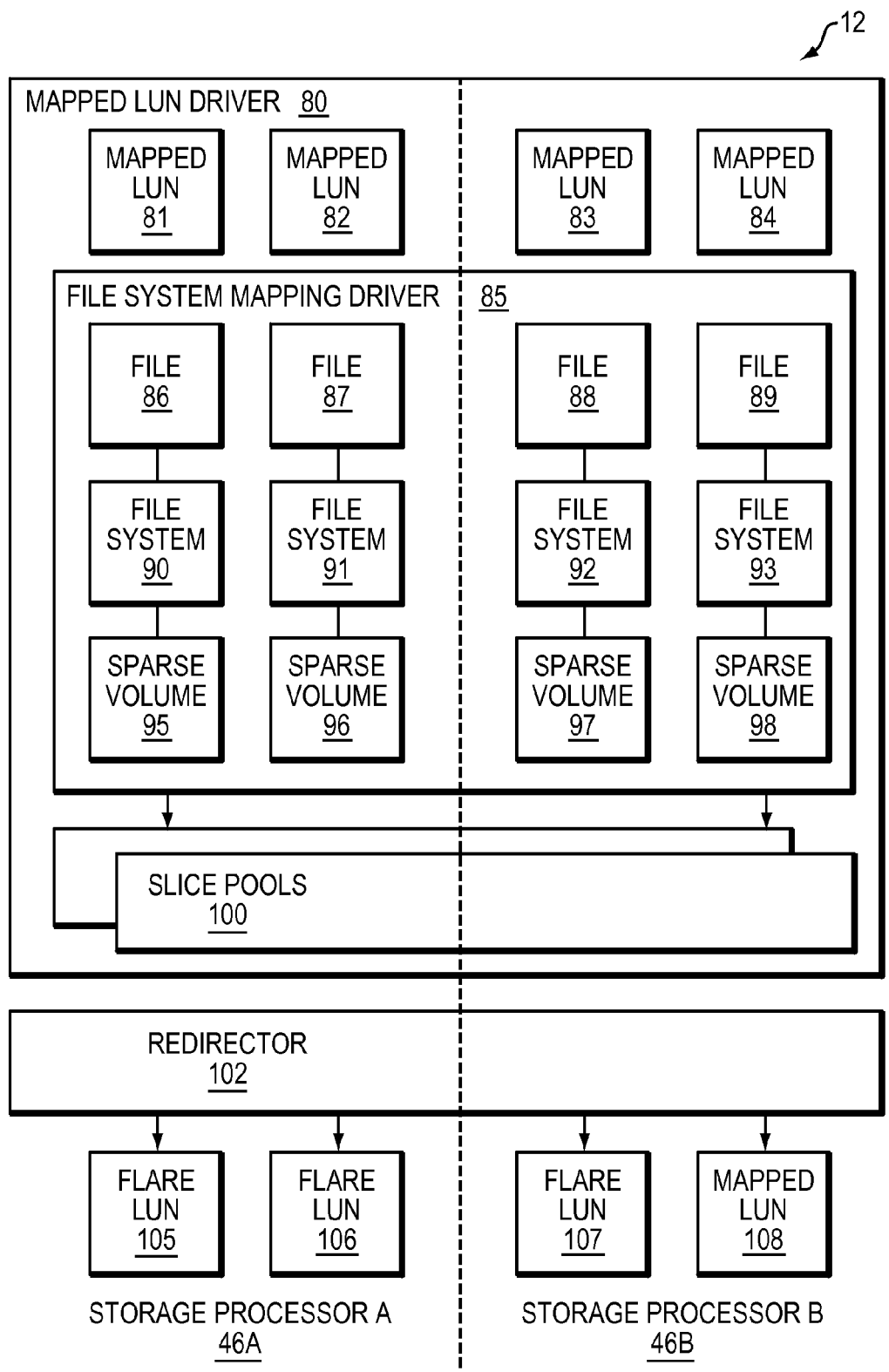
FIGS. 4-5 are block diagrams illustrating in more detail components that may be used in connection with techniques herein.

Referring to FIG. 4, shown is more detailed example of an embodiment of a computer system that may be used in connection with performing the techniques described herein. With reference also to FIGS. 1-3, in a data storage system such as data storage system 12, a storage processor provides communications between host 14 and disk drives 60. Data storage system 12 includes at least two storage processors 46A, 46B. Both storage processor A (SPA) 46A and storage processor B (SPB) 46A provides access to Flare LUNs 105-108 built from a storage space provided by disk drives 60. Generally, a Flare LUN can only be accessed by one storage processor. Redirector 102 interacts with storage processors 46A, 46B to access Flare LUNs 105-108. The access to Flare LUNs 105-108 is independent of which storage processor each Flare LUN belongs to. A user of data storage system 12 allocates storage from Flare LUNs in fixed sized chunks. Each fixed size chunk is known as a slice. One or more slices are grouped together to create a slice pool. Host system 14 provisions storage from slice pools 100 for creating mapped LUNs 81-84. A mapped LUN is a LUN that is visible to host system 14 and a user of a data storage system. A mapped LUN may be a thin LUN (TLU) or a direct LUN (DLU). The size of a thin LUN is independent of amount of available storage. Typically, storage is allocated to a thin LUN when host system 14 issues a write request and needs a data block to write user's data. The size of a direct LUN is dependent of amount of available storage. Typically, storage is allocated to a direct LUN at the time the direct LUN is created and initialized. File system mapping driver 85 is a light-weight file system library that provides file system functionality and allows data storage system 12 to create files within a file system. File system mapping driver 85 processes I/Os directed to metadata of a file system. Mapped LUN driver 80 processes I/Os directed to data of the file system. Mapped LUN driver 80 also provides slices of storage from slice pools 100 to file system mapping driver 85 for creating a file system. Slices of storage can be dynamically added or removed by a file system. When a slice is removed as a part of a storage reclaim operation, the file system redistributes data stored on the slice to other slices in the file system. File system mapping driver 85 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 85 into a logical contiguous address space on which a file system is created. The sparse volume maintains logical to physical mapping for slices of storage in a slice database for the slices that are provisioned to address space of the sparse volume and are in use. Further, the file system maintains a bitmap for every slice of physical storage which is in use by the file system such that the bitmap includes information regarding the entire address space of the file system. Thus, sparse volume 95-98 aggregates one or more slices of physical storage together into a contiguous logical address space while some of these slices may or may not be provisioned. A provisioned slice has physical storage space allocated for storing data in the provisioned slice.

A mapped LUN presents a file as a LUN to host system 11. Further, the file presents a contiguous logical address space to the mapped LUN. For example, in FIG. 4, mapped LUN 81 presents file 86 as a LUN to host system 11, file 86 is created in a file system 90 and file system 90 is created from sparse volume 95. Similarly, mapped LUNs 82-84 presents file 87-89 as LUNs respectively to host system 11, files 87-89 are created in file systems 91-93 respectively and file systems 91-93 are created from sparse volumes 96-98 respectively. Further, sparse volumes 95-98 are created from slices of physical storage included in slice pools 100. At any given time, a storage space for a file system is either allocated (also referred to as provisioned) or not. If a storage space for a file system is not allocated, then there is said to be a hole at that location in a logical extent of the file system.

Figure 5:
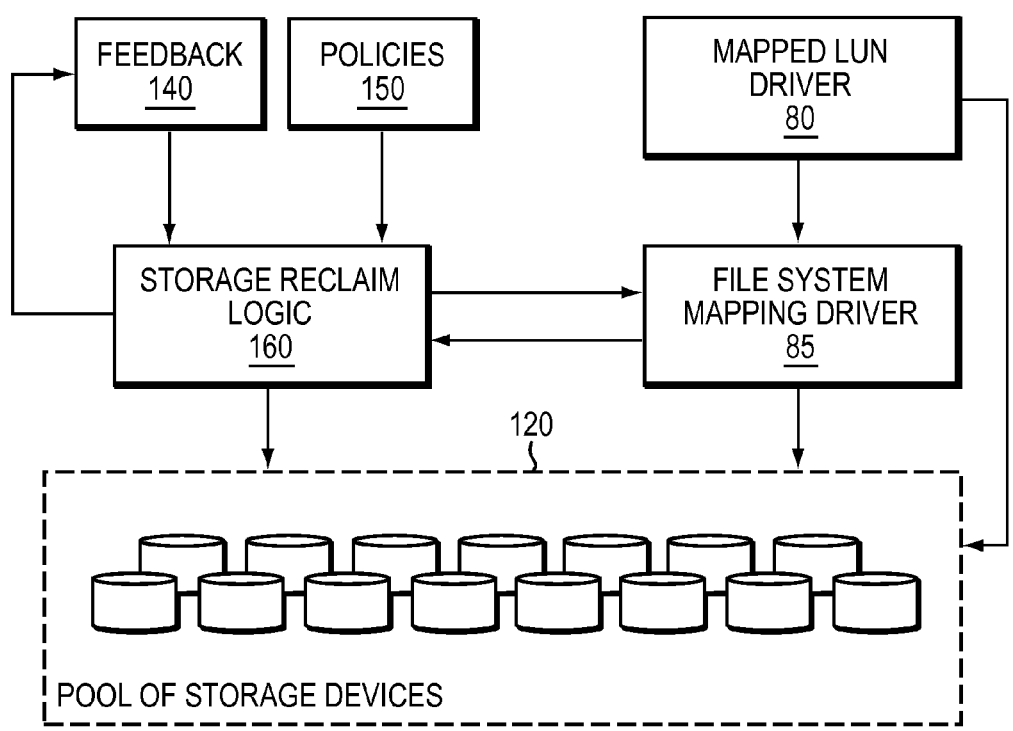

Referring to FIG. 5, shown is more detailed example of an embodiment of a computer system that may be used in connection with performing the techniques described herein. With reference also to FIGS. 1-4, in at least some embodiments of the current technique, a set of file systems may be deployed on a storage system by using logical volumes from storage pool 120. A file system may be organized using different types of mapped LUNs such as thin mapped LUN (TLU) and direct mapped LUN (DLU) thereby having different file system layouts where a file system organized using a TLU is referred to as a thin file system having a thin file system layout and a file system organized using a DLU is referred to as a thick file system having a thick file system layout. Further, data deduplication may be enabled for a thin file system. Further, a file system may be organized and managed by file system mapping driver 85 working in conjunction with mapped LUN driver 80. Further, different types of data services such as replication, snap, file system shrink and backup may be executing on a file system. In at least some embodiments of the current technique, based upon feedback 140 received from a user of a file system and a set of policies 150 indicating the type of optimization desired by the user, storage reclaim logic 160 adaptively changes the rate at which storage space is reclaimed from the file system in a storage system. Thus, in at least one embodiment of the current technique, storage reclaim logic 160 takes into consideration feedback 140 received from a user indicating a policy 150 based on which storage space needs to be reclaimed from file systems organized on a storage system and impact of reclaiming storage space on a set of data services executing on the file systems. Further, the type of a file system layout for a file system may impact how storage is reclaimed from the file system. Thus, impact of reclaiming storage space from a file system may be different based on how the file system has been organized in a storage system. For example, if storage space is reclaimed from a primary file system, corresponding storage space needs to be reclaimed from snapshot copies of the primary file system as well in order to make the storage space available to a storage pool for reuse. Thus, data blocks in a snapshot copy of a primary file system need to be unmapped in order to free storage space associated with such data blocks and make it available to a user. Further, in at least one embodiment of the current technique, the rate at which storage is reclaimed from snapshot copies of a file system is based upon feedback received from a user such as how quickly the user may like to make storage space available and returned as a free storage to a storage pool. Thus, if a policy indicates optimizing storage reclamation based on efficiency of storage space, storage is reclaimed from a file system and snapshot copies of the file system (if such snapshot copies exists) at a fast pace which in turns impact performance of data services such as replication executing on the file system. Thus, in at least one embodiment of the current technique, storage reclaim logic 160 attempts to balance an impact on data services executing on a file system with feedback received from a user thereby adjusting the rate at which storage is reclaimed from the file system such that performance of the data services does not fall below a specific threshold. Consequently, in at least one embodiment of the current technique, a user may be able to influence the rate at which storage is reclaimed in a storage system based on a policy indicated by the user. Thus, in at least one embodiment of the current technique, storage reclaim logic 160 changes the rate at which storage space is reclaimed from a file system based on a policy specified by a user, the file system layout for the file system, data services executing on the file system, and feedback 140 received from the user. Thus, in at least one embodiment of the current technique, the rate at which storage space is reclaimed from a file system is reconciled with data services executing on the file systems and impact of reclaiming storage on performance of a storage system. Thus, in at least one embodiment of the current technique, the rate at which storage space is reclaimed from a file system is adaptively changed based on performance of data services executing on the file system and load on system resources of a storage system. Thus, a policy based storage reclaim logic 160 as described above herein takes into consideration a set of criteria such as the different ways in which a file system may be deployed on a storage system, impact of different data services executing on the file system, and impact on system resources of the storage system.

It should be noted that storage reclaim logic 160 may reside on a storage processor of a storage system. Further, storage reclaim logic 160 may reside outside a storage processor of a storage system.

Figure 6:
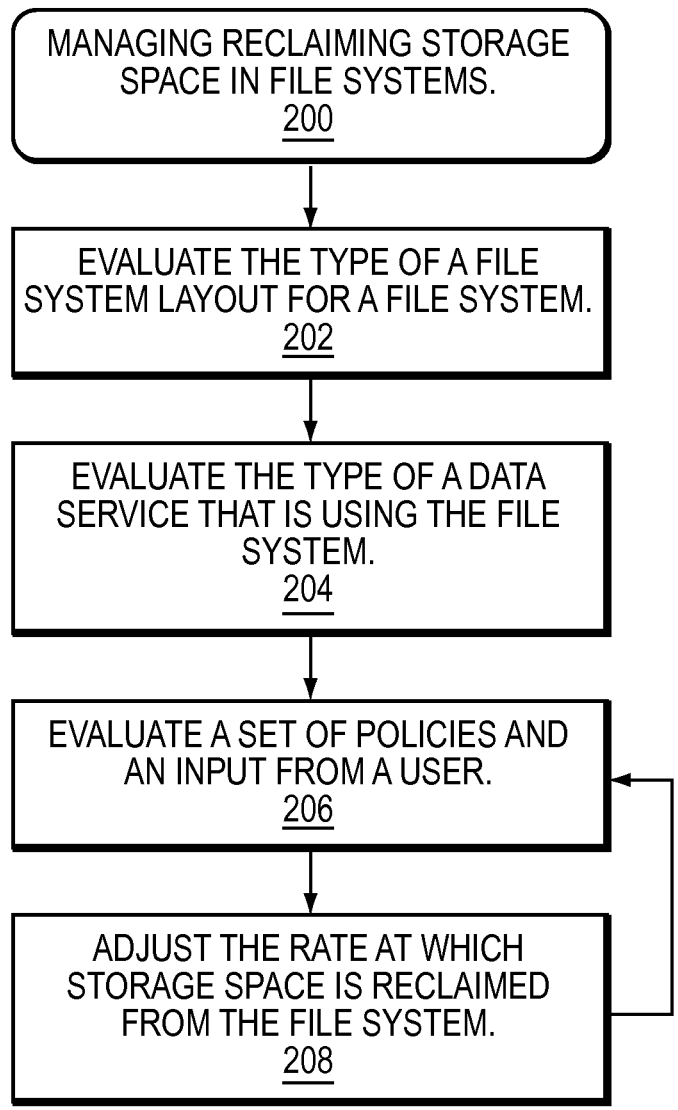
FIG. 6 is a flow diagram illustrating processes that may be used in connection with techniques herein.

Referring to FIG. 6, shown is a more detailed flow diagram illustrating managing reclaiming storage of file systems. With reference also to FIGS. 1-5, reclaiming storage space in file systems is managed in a storage system (step 200). The type of a file system layout for a file system is evaluated (step 202). A file system may be organized on a storage system in any one of different configurations such as a thin file system, a thick file system, or a thin file system with deduplication enabled for data blocks of the file system. The type of a data service that is being performed on the file system is evaluated (step 204). A data service that may be performed on a file system may include any one of services such as replication, snap, backup, and file system shrink. A set of policies and feedback received from a user of the file system is evaluated (step 206). The set of policies may include optimizing a storage reclaim process for storage efficiency, optimizing a storage reclaim process for minimizing load on a storage processor and system resources of a storage system, and optimizing a storage reclaim process for minimizing load on data services executing on a file system. Further, a user may provide feedback regarding impact of reclaiming storage space from file systems on data services that are executing on the file systems such that the rate at which storage space is reclaimed from the file systems may be adjusted dynamically and adaptively (step 208).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing reclaiming storage space in file systems, the method comprising:
   evaluating characteristics of a file system and a set of data services executing upon the file system, wherein the characteristics of the file system includes a file system layout type for the file system indicating a manner in which the file system is organized on a storage system, wherein the file system layout type impacts reclamation of storage space from the file system, wherein the file system layout type includes a thin file system layout and a thick file system layout;
   evaluating feedback received from a user of the file system indicating a policy from a set of policies for affecting reclamation of storage space from the file system; and
   based on the evaluation of the characteristics of the file system and the set of data services executing upon the file system, affecting reclamation of storage space from the file system based on the policy, wherein affecting reclamation of storage space from the file system includes adaptively changing a rate at which storage space is reclaimed from the file system, wherein the policy indicates evaluation of an impact of the set of data services executing on the file system and evaluation of an impact of reclamation of storage space from the file system on a set of storage resources of the storage system.

2. The method of claim 1, wherein the rate at storage space is reclaimed from the file system is adjusted dynamically.

3. The method of claim 1, wherein effecting affecting reclamation of storage space from the file system is based on the feedback received from the user, wherein the feedback indicates impact of reclamation of storage space on the set of data services.

4. The method of claim 1, wherein the set of data services includes a replication service, a snap-copy service, and a backup service.

5. The method of claim 1, wherein the file system layout type includes a thin file system layout with deduplication enabled.

6. The method of claim 1, wherein the set of policies include a policy for optimizing storage efficiency of the storage system, a policy for minimizing load on the storage system, and a policy for minimizing load on the set of data services.

7. The method of claim 1, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

8. The method of claim 1, wherein the file system includes a set of slices, each slice of the set of slices is a logical representation of a subset of physical disk storage.

9. A system for use in managing reclaiming storage space in file systems, the system comprising a processor configured to:
   evaluate characteristics of a file system and a set of data services executing upon the file system, wherein the characteristics of the file system includes a file system layout type for the file system indicating a manner in which the file system is organized on a storage system, wherein the file system layout type impacts reclamation of storage space from the file system, wherein the file system layout type includes a thin file system layout and a thick file system layout;
   evaluate feedback received from a user of the file system indicating a policy from a set of policies for affecting reclamation of storage space from the file system; and
   based on the evaluation of the characteristics of the file system and the set of data services executing upon the file system, affecting reclamation of storage space from the file system based on the policy, wherein affecting reclamation of storage space from the file system includes adaptively changing a rate at which storage space is reclaimed from the file system, wherein the policy indicates evaluation of an impact of the set of data services executing on the file system and evaluation of an impact of reclamation of storage space from the file system on a set of storage resources of the storage system.

10. The system of claim 9, wherein the rate at storage space is reclaimed from the file system is adjusted dynamically.

11. The system of claim 9, wherein effecting affecting reclamation of storage space from the file system is based on the feedback received from the user, wherein the feedback indicates impact of reclamation of storage space on the set of data services.

12. The system of claim 9, wherein the set of data services includes a replication service, a snap-copy service, and a backup service.

13. The system of claim 9, wherein the file system layout type includes a thin file system layout with deduplication enabled.

14. The system of claim 9, wherein the set of policies include a policy for optimizing storage efficiency of the storage system, a policy for minimizing load on the storage system, and a policy for minimizing load on the set of data services.

15. The system of claim 9, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

16. The system of claim 9, wherein the file system includes a set of slices, each slice of the set of slices is a logical representation of a subset of physical disk storage.

\* \* \* \* \*